United States Patent [19]
Weingarten

[11] 3,822,792
[45] July 9, 1974

[54] AIR FLOTATION CARGO HANDLING SYSTEM

[75] Inventor: Joseph L. Weingarten, Kettering, Ohio

[73] Assignee: The United States of America as represented by the Secretary of the United States Air Force, Washington, D.C.

[22] Filed: Nov. 28, 1972

[21] Appl. No.: 310,037

[52] U.S. Cl.................. 214/1 BE, 104/134, 302/17
[51] Int. Cl. ............................................ B60r 3/04
[58] Field of Search ........ 214/1 BE; 302/17, 29, 31; 104/23 FS, 134

[56] References Cited
UNITED STATES PATENTS

| | | |
|---|---|---|
| 3,513,934 | 5/1970 | Crowley.................... 214/1 BE X |
| 3,580,401 | 5/1971 | Stahl............................... 214/1 BE |
| 3,692,192 | 9/1972 | Baldur ............................ 214/1 BE |

Primary Examiner—Frank E. Werner
Attorney, Agent, or Firm—Harry A. Herbert, Jr.; Arthur R. Parker

[57] ABSTRACT

A cargo handling system including a flexible trunk means normally positioned in a relatively flat, uninflated manner on the floor of a cargo aircraft, and inflatable to a cargo supporting position above the level of the floor by the action of compressed air or other gas admitted thereinto. Air passages incorporated in the trunk means automatically transmit the pressurized air or other gas therethrough to form a thin layer-air cushion providing for the floating support thereon of one or more cargo carrying-containers or pallets.

5 Claims, 11 Drawing Figures

3,822,792

AIR FLOTATION CARGO HANDLING SYSTEM

BACKGROUND OF THE INVENTION

This invention relates generally to a cargo aircraft-load-handling system in which unique flexible and inflatable means are utilized to float cargo carrying containers or pallets on the cargo compartment floor of a cargo aircraft.

In currently-used cargo aircraft, the cargo load being delivered thereby is generally carried within flat bottom containers or supported on pallets. A pair of cargo load-guide rails, horizontally disposed and in spaced-apart and fixed relation to the cargo compartment floor are used to slidably guide and position the cargo loads in the correct location. In conjunction with these guide rails, a conveyor-roller system is effective to provide slidable support thereon of the cargo being loaded and transferred. Some automatically operative-interlock means is often used to fix the respective cargo loads in position on the cargo compartment floor. Naturally, such interlock means must be operated to the open, unlocked position when it is desired to remove the cargo. Also, if the particular aircraft is needed to transport vehicles that are to be driven into the cargo compartment, the conveyor-roller system must first be removed.

To eliminate the aforementioned problem of first removing the roller system from the aircraft, before a vehicle may be driven into the cargo compartment, in addition to obviating any need for a cargo-interlock means and thus offer significant and quite obvious advantages over these previously-used systems, the new and improved fluid pressure means of the present invention was developed for floatatingly supporting the cargo on an air cushion means. In this regard, the broad application of the now well-known air cushion principle, originally developed in specific connection with air cushion vehicles, to floatatingly support various cargo loads has been previously suggested for use in the support of palletized loads and/or flat bottom cargo containers on the floor of a cargo aircraft. For example, in U.S. Pat. No. 3,081,886, issued on Mar. 19, 1963 to Flexman et al, there is illustrated an aircraft flooring constructed in a fluid-tight manner with a series of openings 12 (FIG. 5) formed therealong for admitting pressurized fluid therethrough. A plenum chamber, or a supply pipe 14 (See FIG. 3) may be used to supply the pressurized fluid. Supply pipe 14 is shown in communication with manifold conduits 16 that, in turn, provide pressurized fluid to the openings 12, through a series of interconnecting tubes 18. A cargo-carrying pallet, as at 40, is made with its bottom hollow in form and the pressurized fluid is directed into the bell-like chamber formed beneath each pallet to thereby floatatingly support the pallet on an air cushion.

In a second form of a previously-developed cargo-air floatation means, described in U.S. Pat. No. 3,209,929, issued on Oct. 5, 1965 to Peterson et al, the aircraft floor 30 is, again, formed with a plurality of openings, as at 31 in FIG. 1, through which compressed air is admitted for direct action against the bottom of the cargo container, which compressed air is, in this instance, expressly referred to as acting as a lubricating film to thereby reduce the normal coefficient of friction that would otherwise exist between the bottom of the container and the aircraft floor, or supporting means on the floor, and thus facilitate the movement of the container therealong. Various other air floatation means have been proposed, as for example, that disclosed in each of U.S. Pat. Nos. 3,006,288; 3,419,164; 3,486,719 and 3,612,316. However, the cargo-air flotation means in none of the aforementioned patents actually disclose the new and novel flexible and inflatable cargo-air floatation technique of the present invention which inherently incorporates obvious advantages that will become readily apparent hereinafter in the following summary and detailed description.

SUMMARY OF THE INVENTION

The present invention consists briefly in a unique air floatation means for supporting cargo carrying-containers or pallets on or relative to the floor of a vehicle, such as a cargo aircraft. It utilizes, in a new and novel manner, the air cushion principle previously applied in the propulsion of air cushion vehicles, by replacing the conventional system of conveyor-rollers in use with present cargo aircraft with a unique elongated trunk arrangement that comprises, in the preferred form thereof, a pair of separate, flexible and therefore inflatable trunks, conduits or ducts that are positioned in spaced-apart relation and longitudinally disposed along or within the cargo compartment floor of the delivery aircraft inwardly of the normally-employed, main cargo load-guide rails. Each of the said pair of trunks may be inflated to their cargo-supporting position by the use of any suitable compressed air or other gas supply source, as for example, by means of one or more air blowers that may be mounted below the floor and placed in communication with the respective trunk. The introduction of a continuous supply of compressed air, for example, by the actuation of the said air blowers, in addition to causing the inflation of the inventive trunks, accomplishes another unique function taught by the present invention; namely, the formation of an air cushion beneath the cargo load. For this express purpose, each trunk incorporates a plurality of appropriately-positioned openings or air passages that may be disposed through the surface of each trunk in such a predetermined manner so as to ensure that the air cushion is being uniformily applied throughout and upwardly against the bottom surface of the supported load.

To better concentrate and thus ensure a more positive lifting force for the aforementioned air cushion that is sufficient to lift and resiliently support thereon substantially heavy loads, another unique feature of the present system involves the provision of one or more physical barrier elements mounted on the aircraft cargo compartment floor in transverse and interconnected relation between and to the said pair of inflatable trunks at regularly-spaced intervals. This novel and yet simplified barrier technique, in effect, provides a series of separate compartments into which the pressurized air is thereby trapped and thus concentrated to thus provide a greater lifting force. Said physical barriers or traps, of course, perform this function by preventing the flow of air in either the forward or aft directions and, in this manner, enables the rapid build-up of pressure in the particular compartment so formed.

Inherent objects and other advantages of the invention will become self-evident hereinbelow in the following description, taken in connection with the accompanying drawings, in which:

DESCRIPTION OF THE PREFERRED EMBODIMENT

Figure 1:
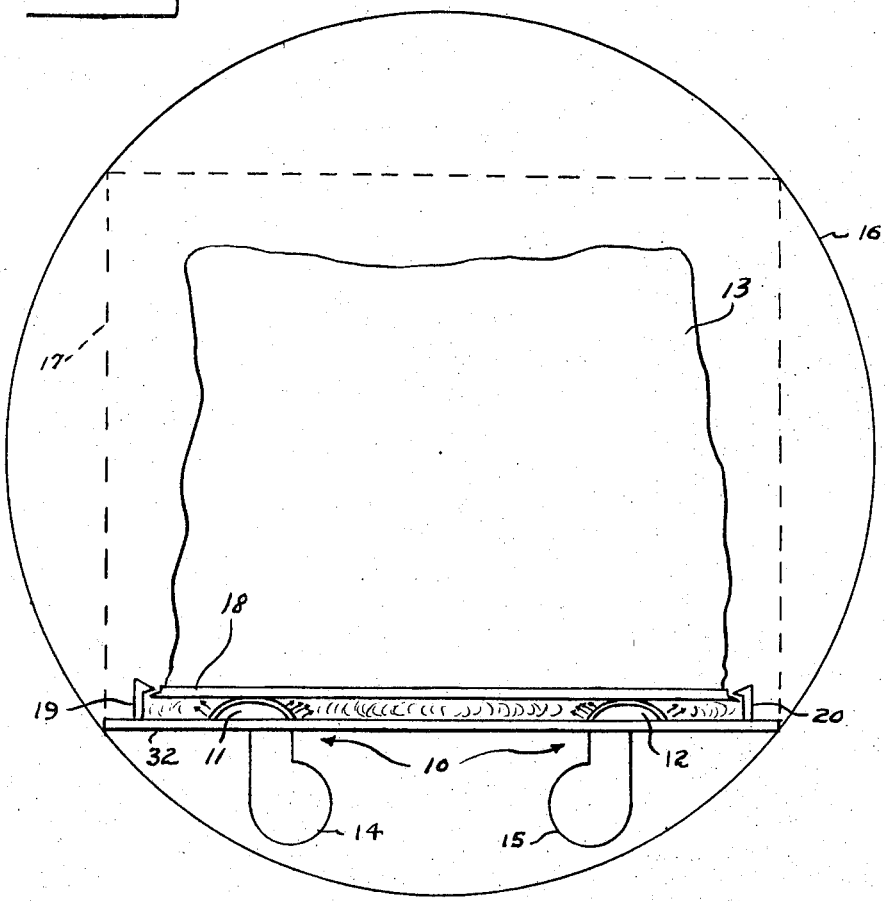
FIG. 1 illustrates an overall rear end and schematic view, showing the new and improved aircraft cargo handling-air floatation trunk system of the present invention installed and in its inflated condition for thereby resiliently supporting a cargo load thereon.

Referring generally to the drawings and, in particular, to FIG. 1 thereof, the new and improved air floatation-cargo handling system of the present invention is indicated generally at 10 as consisting of a pair of spaced-apart trunks 11 and 12 that may each consist of a relatively elongated, flexible and therefore inflatable conduit or duct that extends in parallel and longitudinal relation along the length of the aircraft cargo compartment-floor, indicated at 32. Of course, when inflated, said pair of trunks 11 and 12 provide floatating support for the transport or transferred thereon and/or thereover of one or more cargo loads, as at 13, in a unique manner to be described hereinafter in detail. To provide for the requisite inflation thereof, each of the said trunks 11 and 12 may be formed with one or more air or other gas inlet passages (not shown) in communication with the outlets from one or more suitable compressed air or other pressurized gas-supply means, such as the blowers indicated in schematic form at 14 and 15. Alternatively, the outlets from such blowers could be, if desired, connected directly to and be placed in open communication with, one or the other end of the trunks 14, 15. In either event, suitable compressed air or other pressurized gas may thereby be introduced into the hollow interior of each of the trunks 11 and 12 in the direction, for example, indicated respectively by the arrows "A" and "B" in FIG. 2. Again, referring to FIG. 1, the general outline of each of the aircraft fuselage and cargo compartment is indicated respectively at the reference numerals 16 and 17. Also, the usual aircraft cargo compartment-guide rails for slidably supporting opposite sides of the cargo containers or pallets, an example of the latter being denoted at 18, are depicted in schematic form at 19 and 20 as being mounted on the upper surface of the aircraft cargo compartment floor 32.

Figure 2A:
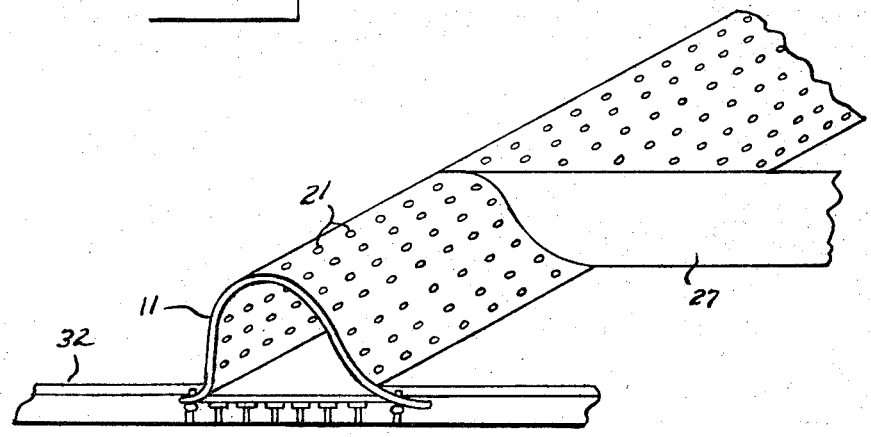
FIGS. 2 and 2a respectively depict rear end and perspective views, partly schematic and broken-away, illustrating further details of the inventive air floatation trunk system.
Figure 2:
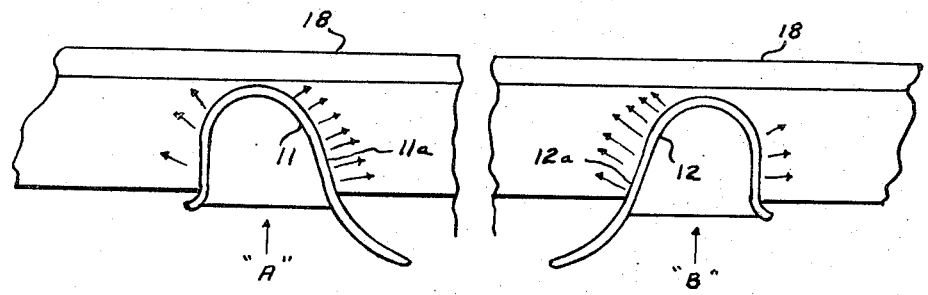
Figure 4:
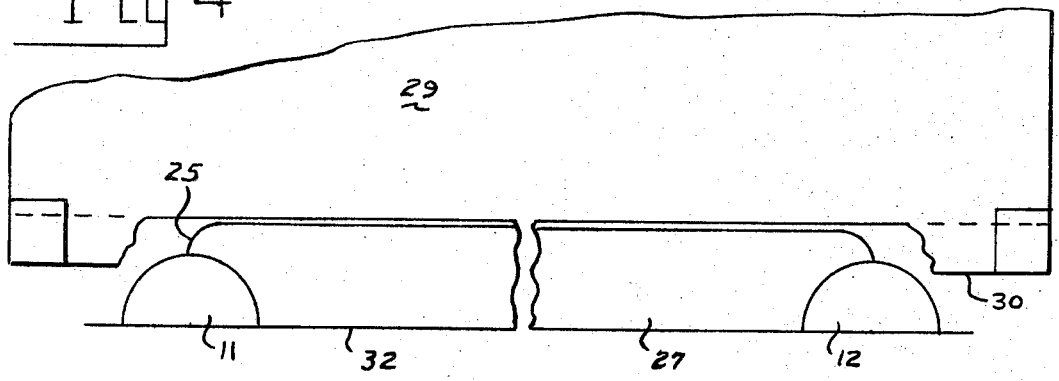
FIGS. 4 and 4a respectively represent other end and perspective views, partly schematic and broken-away, showing the use of one or more air trap barriers that may be used with, and as an integral part of the inventive trunk system.
Figure 4A:
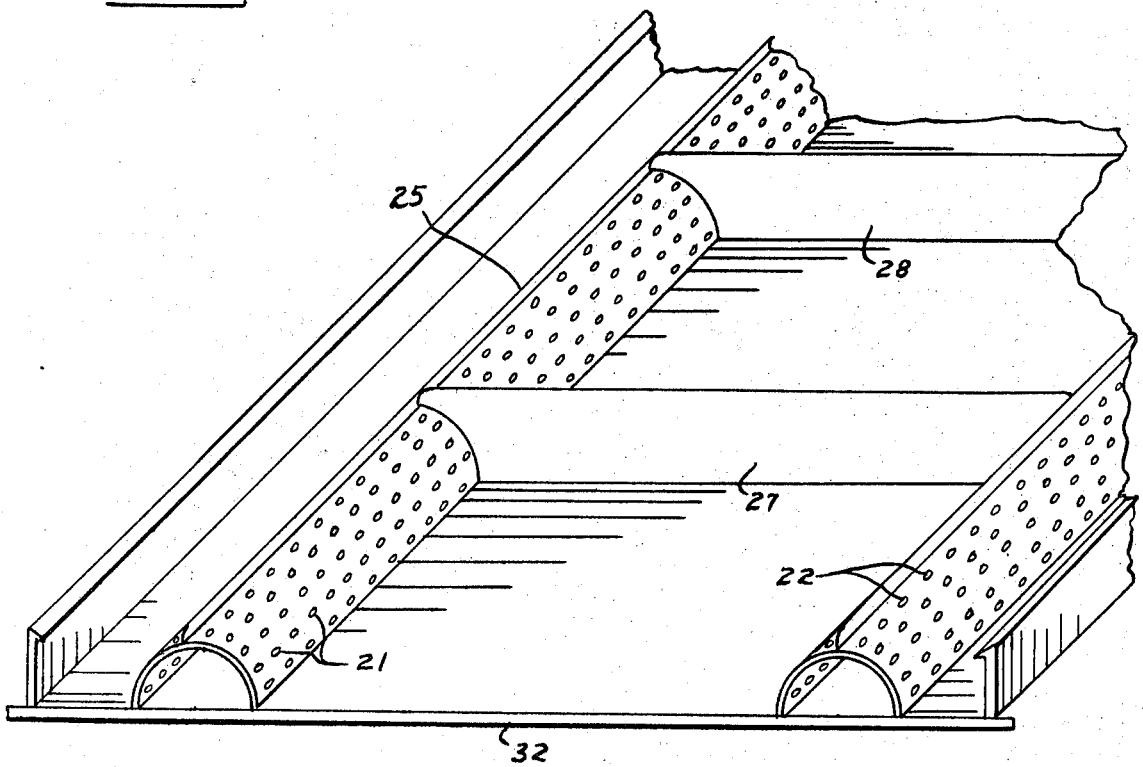

Actually, upon the pumping of compressed air, for example, from the blowers 14, 15 into the interior of, and thereby inflating each of the trunks 11 and 12, a first and second series of air passage-holes, as for example as indicated respectively at 21 and 22 in FIG. 4a, allows and ensures the positive directed flow of pressurized air into the various spaces inherently formed between each of the said trunks and the bottom of the cargo carrying-pallet, as at 18, and as is more clearly depicted in the aforementioned FIG. 2. A key feature of this arrangement resides in the judicious selection of the location and relative disposition of the aforementioned holes 21, 22 so that a greater number of such holes are formed in the respective inward facing surfaces 11a and 12a of the trunks 11 and 12 to thereby positively ensure a greater flow of air beneath the greater portion or extent of the bottom surface of the cargo pallet 18 that is disposed in intermediate relation between the said trunks. In this manner, the distribution of a uniform flow of compressed air or air cushion across and beneath the entire cargo pallet 18 is assurred. Thus, a uniform lifting force is accomplished. In this regard, although the preferred embodiment of the present invention is described specifically in reference to the use of a flat bottom cargo container or pallet, it is to be clearly understood that any object without a flat bottom could also be supported so long as it incorporated a cavity to retain air, as for example, the undercarriage of an intermodal container. Also, even though the preferred form of the invention is described with specific reference to an aircraft, it is to be equally understood that the present invention is clearly applicable for use in warehouse operations, on trucks, loaders, or any other ground handling vehicle where a cargo load rests on a vehicle. More, the inventive system is likewise useable in airdrop operations in flight, as well as in the movement of cargo within the aircraft.

Figure 3:
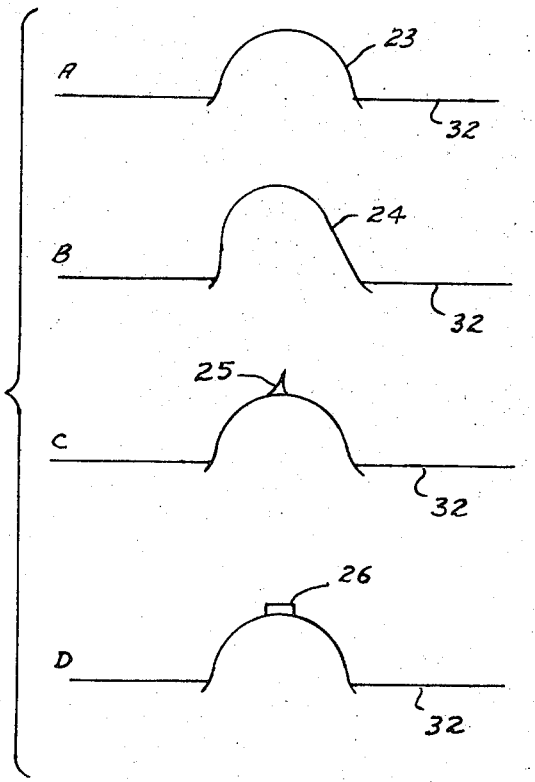
FIGS. 3A, B, C and D illustrate in schematic and inflated form various trunk configurations utilizable with the present invention.

The aforementioned trunks 11 and 12 may each be formed from a flat sheet that inflates into a semi-circular configuration, as is depicted, for example, schematically at 23 in FIG. 3A, or, alternatively formed into the shaped trunk 24, or with either the flat sheet with an air trap flap at 25, or a substantially frictionless surface at 26, as is depicted in schematic form respectively in FIGS. 3B, C and D. Of course, both the air trap 24 and substantially frictionless surface 26 may be used with any trunk shape.

With particular reference to FIGS. 2a, 4 and 4a, another key feature of the present invention resides in the unique provision of one or more air trap barriers, as at 27 and 28, which barriers extend in transverse relation across the aircraft cargo compartment floor 32 between the trunks 11 and 12. Since the said trunks extend longitudinally of the cargo compartment and therefore are disposed in parallel relation to the flow of cargo movement, the aforesaid air trap barriers, as at 27 and 28, act to stop and trap the flow of compressed air being introduced into the spaces beneath the supported cargo, through the air passage-openings or holes, as at 21 and 22, formed in the said trunks 11 and 12. Thus, the said air trap barriers 27, 28 are automatically operative to prevent the flowing air from movement in the forward and/or aft directions, and thus specifically provides for the positive pressure build-up and concentration of the compressed air under the cargo being supported and moved thereover. This operation automatically ensures that a substantial air cushion is formed beneath and acts to, in effect, actually float relatively heavy cargo being supported thereon. The actual position and number of the said air trap barriers, 27, 28, depends naturally on the size and weight of the cargo to be transported. For example, on a 7 foot long pallet, the air trap barriers would be set at 2 foot intervals, with the result that 6 feet of the length of the pallet would be disposed over pressure or air cushion areas at all times. The air trap barriers, as at 27 and 28, are, in a manner similar to that of the trunks 11 and 12, made of a flexible or expandable material and are also equipped with air passages disposed therethrough to thereby provide for air flow thereinto with the resultant expansion thereof along with the inflation of the trunks 11 and 12.

The previously-referred to air trap flap 25 of FIG. 3C could be used as illustrated in FIG. 4, for example, in an integral attached relation between the top of each of the trunks 11, 12 and the opposite ends of each of the said air trap barriers, as at 27, to thereby form an air-tight relation between the barriers and the said trunks, and thus greatly assist in the previously-noted trapping of compressed air and build-up of pressure in the several compartments formed beneath the supported cargo load by the use of such barriers. In the aforementioned FIG. 4, the reference numeral 29 is used to indicate a cargo container having an undercarriage indicated in schematic and broken-away form at 30.

Figure 5:
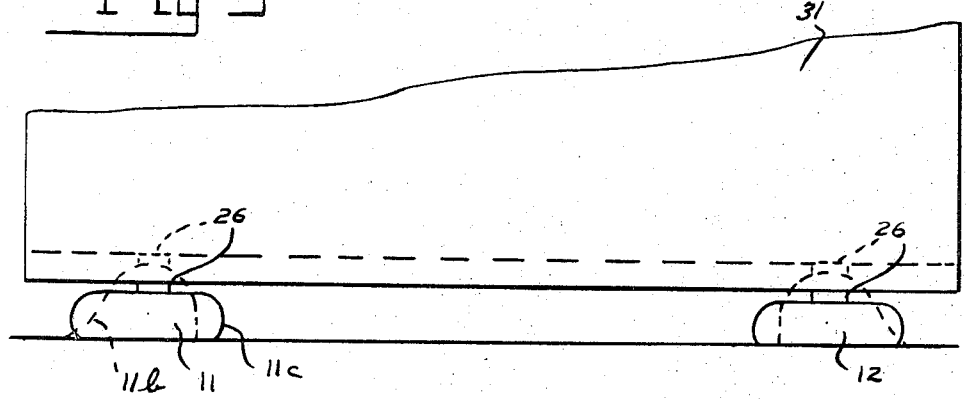
FIG. 5 is another partly schematic and partly broken-away, rear end view depicting a heavy cargo load being supported directly on top of, and in direct contact with the inventive trunk system.

The previously-mentioned substantially frictionless surface 26 of FIG. 3D, which may be comprised either of an extra teflon element, or a teflon coating on the top surface of each of the trunks 11 and 12, may preferably be used when a particularly heavy cargo load, as represented schematically at 31 in FIG. 5, is being transported over the said trunks 11 and 12, and the power of the blowers, as at 14 and 15 (FIG. 1) or any other compressed gas supply means being used may be too low to provide an air cushion of a sufficient force per se to provide the entire cargo load support. Thus, the relatively heavy cargo load, as at 31, could be rather easily transported in the cargo compartment because of the combined support and action of both the inflated trunks, the air cushion being formed which, nevertheless, still provides substantial support per se, and the use of the aforementioned substantially frictionless, teflon surface in direct sliding contact with the load. In this connection, as depicted in the aforementioned FIG. 5, the normally unloaded inflated condition and the under load-inflated condition of the said trunks 11 and 12 are respectively indicated, for example, by the broken and solid lines at 11b and 11c for the trunk 11.

Figure 6:
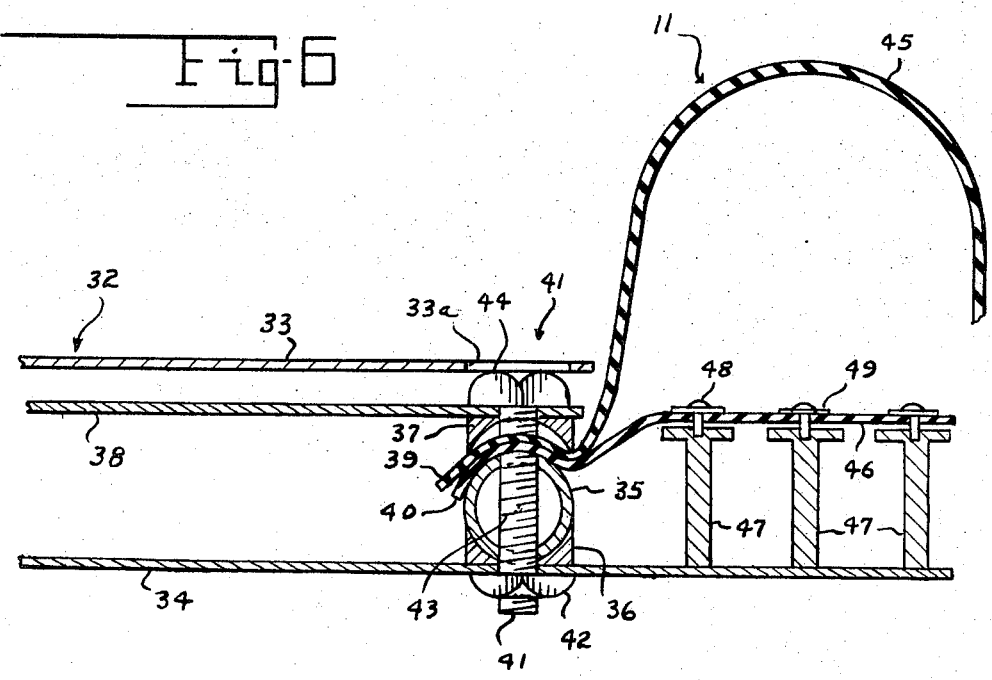
FIG. 6 is a relatively enlarged and partly broken-away view, in cross-section, showing details of one type of a releasable attachment means between the inventive trunk system and the aircraft floor.

Each of the inventive trunks, as for example trunk 11 depicted in FIG. 6, may be fixedly held, in its uninflated condition, in a resting, and relatively flat and recessed position within the aircraft cargo compartment floor, indicated in the aforementioned FIG. 6 generally at 32, below the upper floor surface-support 33 thereof. For the express purpose of positively and yet quick-releasably attaching each trunk, as at 11, on, or within the aircraft floor structure, the latter, in addition to the previously-referred to upper floor surface-support 33, includes or incorporates a lower floor surface-support at 34 that is naturally spaced from and below the said upper floor surface-support 33, as is clearly shown. A relatively elongated hollow tubing member 35, positioned in supporting relation on the floor support 34 within a first, lower cradle-type support/position plate member 36, extends longitudinally of the aircraft floor 32. A second, upper cradle-type support/position plate member 37 that is affixed in depending relation on the lower surface of a portion of an intermediately-positioned, main support plate member 38, in direct alignment over, and in a predetermined spaced relation with, the said first, lower cradle-type support/position plate member 36, is uniquely cooperative in the specific manner to be hereinafter described in detail to provide for the releasable attachment of the inventive trunks, as at 11, to the floor structure and between both cradle support/position plate members 36, 37. To provide for the aforesaid releasable attachment, the flexible flat sheet material structure comprising each of the inflatable trunks, as at 11, may be folded back upon itself, as is clearly depicted in the aforementioned FIG. 6, to thereby form a pair of overlapping edge portions along one side of the trunk, as indicated respectively at 39 and 40, which side edge portions 39, 40 are positioned together in a relatively snug-fitting relation between the aforesaid second, upper cradle-type support/position plate member 37 and the top surface of the tubing member 35. Said pair of overlapping side edge portions 39 and 40 may be fixedly and quick-releasably held together in the above-described position between the upper cradle-type support/position plate member 37 and the tubing member 35 by means of a bolt and nut arrangement indicated respectively at 41 and 42. The threaded portion 43 of the bolt extends through aligned openings formed in the main support plate member 38, at the appropriate location in each of the overlapping side edge portions 39 and 40 of the trunk 11, for example, and, of course, in the tubing member 35. The head portion 44 of the bolt 41, which is accessible through an opening 33a in the upper floor surface-support 33, is rigidly engaged against the top surface of the member 38 when the nut 42 is tightly fastened in place. With this attachment means, the removal and replacement of a damaged trunk may be easily and quickly performed simply by removing the bolts, as at 41, on either side.

The above-noted folding back of the flat sheet configuration of the inventive trunks, as described hereinabove for trunk 11, in effect, forms or divides each trunk into an upper trunk portion 45 and a lower trunk portion 46 (Note FIG. 6). The latter is fixed in position below the level of the upper floor surface-support 33 of the aircraft floor 32, to a series of upright and T-shaped support members 47 mounted in spaced-apart relation along the lower floor surface-support 34. To this end, the appropriate sections of the lower trunk portion 46 are fixed in position to the respective upright support members 47 by the screw members at 48, each of which incorporating a reinforcing position plate, as at 49, in interposed relation with the top surface of the lower trunk portion 46.

With the foregoing attachment of the lower trunk portion 46 being oriented well below the upper floor surface-support 33, each of the improved trunks, as at 11, when deflated, will clearly lie in a recessed position out of the way below the upper floor surface-support 33 of the aircraft cargo compartment-floor 32, when it is not in use. Of course, when inflated, the upper trunk portion of each trunk, as at 45 for the trunk 11 (FIG. 6), will automatically expand upwardly out of an appropriately-sized opening extending in a longitudinal direction along the said floor 32 for thereby raising cargo off the floor by means of the previously-described air floatation means. In this novel and yet simplified manner, the relatively frictionless movement of the cargo loads being transported thereover is assured. After the cargo has been properly positioned in the aircraft, it is a simple matter to merely deflate the inventive pair of trunks 11 and 12, by shutting off the compressed air supply, to thereby once again provide a flat floor. Thus, the loading of vehicles is quite easily accomplished and, moreover, a better load distribution on the floor is achieved by enabling the cargo pallet to be placed over the entire area encompassed by the pair of trunks 11 and 12 and not just on the rollers usually found in cargo aircraft.

I claim:

1. Means for floatatingly supporting and thereby facilitating the substantially frictionless transfer of cargo containers and/or palletized loads onto, out of and within the cargo compartment of a delivery vehicle having a pair of parallel and spaced-apart, main cargo load-guide rails extending longitudinally of, and mounted on the cargo compartment-floor, said means comprising; a pair of relatively elongated, flexible cargo support-duct members built into, and supported in parallel and spaced-apart relation by the cargo compartment floor, and each being adjustable between a first, lower recessed and non-cargo-supporting position within, and below the top surface of the cargo compartment floor, and a second, upper position above the top surface of said floor in an inflated cargo-supporting position; and compressed gas-supply means in communication with and thereby supplying a continuous supply of compressed gas into the interior, and thus providing for the automatic inflation of the said flexible cargo-support-duct members to the said second, upper, cargo-supporting position; each of said flexible cargo support-duct members having first, compressed gas-inlet passage means in communication with, and receiving the continuous supply of compressed gas from said compressed gas-supply means; and second, compressed gas-outlet means oriented to direct a continuous stream of pressurized gas from the interior of said duct member in the form of an air cushion uniformily applied upwardly against the bottom of, and thus providing substantial support to the said cargo containers and/or palletized loads; each of said of cargo supportduct members incorporating a first, relatively fixed, lower duct-element releasably attached to a supporting structure fixed to the floor and oriented substantially below the top surface of the floor; and a second, upper duct-element having an edge portion releasably attached with said first, lower duct-element to the said floor and an intermediate portion movable relative to said first, lower duct-element to the second, upper and inflated, cargo-supporting position of each of said pair of cargo support element-duct members.

2. In means for floatatingly supporting and thereby facilitating the substantially frictionless transfer of cargo containers and/or palletized loads as in claim 1; and air trap-barrier means disposed in transverse relation between said pair of flexible cargo support -duct members for trapping the compressed gas, being directed through said compressed gas-outlet means, to form an air cushion with the said cargo containers and/or palletized loads, in both forward and aft directions to thereby form one or more air cushion-compartments for concentrating the pressure and thus the lifting force being exerted by the said compressed gas-air cushion.

3. In means for floatatingly supporting and thereby facilitating the substantially frictionless transfer of cargo containers and/or palletized loads as in claim 2, wherein said air trap-barrier means comprises one or more spaced-apart, flexible conduits positioned across the cargo compartment floor between the said pair of cargo support-duct members and each incorporating compressed gas-passages for providing for their simultaneous expansion with the inflation of said pair of cargo support duct members to thereby ensure the said trapping and concentration of the compressed gas beneath the said cargo containers and/or palletized loads.

4. In means for floatatingly supporting and thereby facilitating the substantially frictionless transfer of cargo containers and/or palletized loads as in claim 3, wherein each of said pair of cargo support-duct members and said transverselyextending air trap-barrier conduits incorporates an integral air trap flap element attached between the top portions thereof to thereby provide a positive seal against the flow of compressed gas therebetween.

5. In means for floatatingly supporting and thereby facilitating the substantially frictionless transfer of cargo containers and/or palletized loads as in claim 3, wherein the upper portion of each of said pair of cargo support-duct members may further incorporate an additional substantially frictionless surface or element for further facilitating the relatively easy movement of cargo containers and/or palletized loads thereacross, when the weight thereover is relatively heavy by comparison with the lifting force being developed by the air cushion formed between the cargo containers and/or palletized loads, and the cargo support-duct members.

* * * * *